United States Patent
Chen et al.

(10) Patent No.: US 9,226,516 B2
(45) Date of Patent: *Jan. 5, 2016

(54) EDIBLE PET CHEW WITH GLUTEN FREE OUTER LAYER

(71) Applicant: Wenzhou Yuxiang Pet Product Co., Ltd., East Shuitou, PingYang, ZhenJiang (CN)

(72) Inventors: Zuxi Chen, Zheijang (CN); Zuhua Chen, Zheijang (CN); Xiang Chen, Zheijang (CN)

(73) Assignee: WENZHOU YUXIANG PET PRODUCT CO., LTD., East Shuitou, Pingyang, Zhenjiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/554,424

(22) Filed: Nov. 26, 2014

(65) Prior Publication Data

US 2015/0208690 A1    Jul. 30, 2015

Related U.S. Application Data

(63) Continuation of application No. 14/292,693, filed on May 30, 2014, now Pat. No. 8,900,649, which is a continuation of application No. 14/166,491, filed on Jan. 28, 2014, now abandoned.

(51) Int. Cl.
| | |
|---|---|
| *A23K 1/18* | (2006.01) |
| *A01K 29/00* | (2006.01) |
| *A23K 1/14* | (2006.01) |
| *A23K 1/10* | (2006.01) |

(52) U.S. Cl.
CPC . *A23K 1/143* (2013.01); *A23K 1/10* (2013.01); *A23K 1/106* (2013.01); *A23K 1/14* (2013.01); *A23K 1/1853* (2013.01)

(58) Field of Classification Search
IPC ............ A23K 1/146,1/184, 1/1826, 1/1813, A23K 1/143, 1/10, 1/14, 1/106, 1/1853
See application file for complete search history.

(56) References Cited

U.S. PATENT DOCUMENTS

| | | | | |
|---|---|---|---|---|
| 4,904,494 | A * | 2/1990 | Spanier | 426/646 |
| 5,673,653 | A | 10/1997 | Sherrill | |
| 5,894,029 | A * | 4/1999 | Brown et al. | 426/302 |
| 7,677,203 | B2 | 3/2010 | Stern | |
| 8,449,937 | B2 | 5/2013 | Chen | |
| 2005/0084599 | A1 * | 4/2005 | Umeda et al. | 426/601 |
| 2005/0233038 | A1 | 10/2005 | Weinberg | |
| 2005/0266146 | A1 * | 12/2005 | Shu | 426/641 |
| 2006/0105025 | A1 * | 5/2006 | Hill et al. | 424/442 |
| 2007/0231554 | A1 * | 10/2007 | Bastioli et al. | 428/219 |
| 2010/0040745 | A1 | 2/2010 | Capodieci | |
| 2011/0052661 | A1 * | 3/2011 | Weiss | 424/442 |
| 2012/0234259 | A1 * | 9/2012 | Xu | 119/710 |
| 2012/0309855 | A1 * | 12/2012 | Akamatsu | 514/783 |
| 2013/0133588 | A1 | 5/2013 | Chen et al. | |

FOREIGN PATENT DOCUMENTS

| | | |
|---|---|---|
| DE | 19501142 | 7/1996 |
| EP | 1692946 | 8/2006 |

OTHER PUBLICATIONS

Chandler: "Essentials of nutrition in dogs and cats with gastrointestinal disease", In Practice, British Veterenary Association, London, GB, vol. 24, No. 9, Oct. 1, 2002, pp. 528-533.

Guildford:"Nutritional Management of gastrointnestinal tract diseases of dogs and cats", The Journal of Nutrition, American Society for Nutrition, US, vol. 124, No. 12s, Jan. 1, 1994, pp. 2663s-2669s.

* cited by examiner

*Primary Examiner* — Chhaya Sayala
(74) *Attorney, Agent, or Firm* — Davidson, Davidson & Kappel, LLC

(57) ABSTRACT

A pet chew includes an outer layer; and an inner layer, the outer and inner layers being laminated and rolled into a cylindrical shape having knots at both ends, the outer layer including at least one of potato and sweet potato.

15 Claims, 1 Drawing Sheet

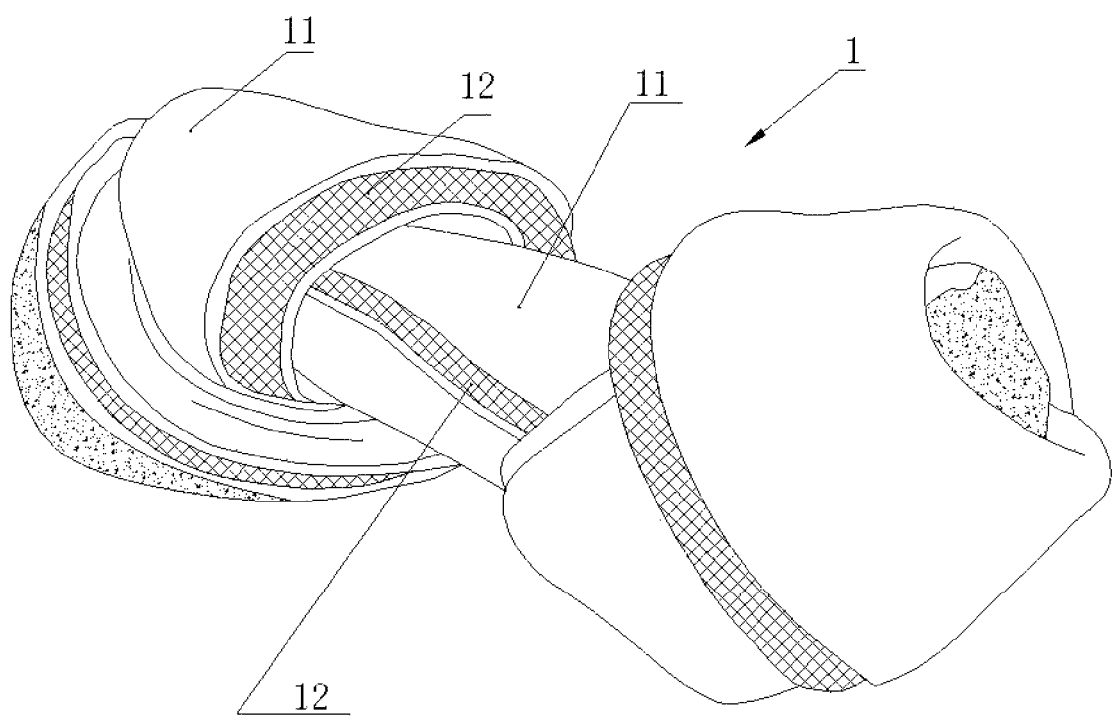

EDIBLE PET CHEW WITH GLUTEN FREE OUTER LAYER

This is a Continuation Application of U.S. patent application Ser. No. 14/292,693, filed May 30, 2014, now U.S. Pat. No. 8,900,649 which is a Continuation Application of U.S. patent application Ser. No. 14/166,491, filed Jan. 28, 2014, now abandoned, all of which are hereby incorporated by reference herein.

The present invention relates to an edible pet chew and a preparation method of same.

BACKGROUND OF THE INVENTION

At present, edible pet chews produced from the prior art typically are made from rawhide and jerky, for example in the shape of a knotted bone, as described for example in U.S. Pat. No. 5,673,653. Such traditional knotted bone from rawhide, produced for the purpose of teeth grinding and chewing, has the disadvantages of mono-nutrition, excessively hard skin and poor palatability as well as environmental pollution, high cost and an insufficient source of raw materials.

U.S. Pat. No. 7,677,203, describes a knotted bone pet chew produced with plant starch as a main raw material for the outer casing. With plant starch as a main raw material, this chew has only the characteristics of dog feed and little or no teeth grinding and chewing functions.

U.S. Patent Application No. 2012/0234259 describes a knotted bone pet chew with a meat and rice based outer layer.

SUMMARY OF THE INVENTION

An object of the present invention is to provide a layered pet chew in which the outer layer can be made gluten free and also can be shaped and used in a laminated pet chew product, such as a dog chew, with the pet not experiencing digestive or other issues.

The present invention provides a pet chew comprising: an outer layer and an inner layer, the outer and inner layers being laminated and rolled into a cylindrical shape having knots at both ends, the outer layer including potato or sweet potato.

By having the outer layer made with potato or sweet potato, other ingredients such as rice powder, which can cause digestive issues, or wheat, which contains gluten, can be dispensed with, while still providing a solid, nutritious and durable layered pet chew.

While the preferred shape is a laminated dog chew with knotted ends, other layered shapes are possible in less preferred embodiments. The present invention thus also provides a pet chew comprising: a first layer; and a second layer, the first and second layers being rolled into a cylindrical shape; the first layer including at least one of potato and sweet potato. The first layer can be with ingredients similar to the outer layer above, and the second layer similar to the inner layer.

BRIEF DESCRIPTION OF THE DRAWINGS

FIG. 1 is a schematic view of the product of the present invention.

DETAILED DESCRIPTION

With reference to FIG. 1, the pet chew 1 released in the present invention includes an outer layer 11 and an inner layer 12. Layer 11 and layer 12 are laminated and rolled into a cylindrical shape. The resultant cylindrical body is knotted at its both ends.

The inner layer 12 preferably is made of an animal-product based jerky, most preferably chicken breast jerky.

The inner layer 12 preferably constitutes 5 to 10% of the total weight of the pet-chew 1, and most preferably about 7 percent.

The outer layer 11 can include potato and/or sweet potato, for example added in the form of powder, as well as bone powder or meal, for example ox, cattle, pig or chicken bone powder or meal, or a combination thereof.

The outer layer 11 including potato and/or sweet potato preferably may be free of rice and wheat and other grains, and be gluten free. The percentage of potato and sweet potato powder in the outer layer, by weight, is preferably at least 20%, and can be between 20 and 30%, most preferably around 25%. Such a percentage has been found to permit good chewability and durability for the outer layer, especially when used with animal based products that are 50% or more of the outer layer.

Most advantageously, the percentage of sweet potato is at least 10 percent. Sweet potato can prove color and extra nutritional value over potato alone.

By using bone powder or meal, the outer layer also may be free of rawhide or other animal skin products while still maintaining good durability.

The bone powder preferably constitutes 8 to 12% of the total weight of outer layer 11, and most preferably about 10%.

Substantial amounts of vegetable other than sweet potato and potato, such as pumpkin and carrot, advantageously can still be added, preferably in an amount about 10% to 12% by weight of the outer layer. While these vegetables have little starch to hold together the layer, the other ingredients aiding binding permit such inclusion.

One of those ingredients for example can beef gelatin in amount of approximately 6 to 7%. Another is carboxylmethylcellulose, which may be added for example from in the amount of 1 to 3% in the outer layer, for example 2%.

In one preferred embodiment, the outer layer 11 comprises in the following weight percentages of the outer layer 11:

fresh ground chicken 25% (or lamb or pork or other animal based materials)
cooked bone meal 10.4%
fresh beef (or lamb, pork or other animal based materials) 15%
potato flour 13%
sweet potato flour 12%
beef gelatin 6.6%
pumpkin powder 5.9%
glycerin 3%
carboxylmethylcellulose 2%
carrot 5.5%
salt 0.5%
natural coloring 0.6%
edible natural flavor 0.5%

The total weight of outer layer 11 from animal sources advantageously is 50% or more, providing good protein, in addition to any protein from the inner layer 12.

The proportion of meat, which has excellent protein, is preferably between 35 and 45 percent, most preferably about 40%, and may contain chicken, beef, lamb, turkey and pork for example.

The proportion of edible glycerin is preferably between 2 and 4% and most preferably about 3%, with a proportion of gelatin around 6 to 7%.

Natural coloring may also be added, for example between 0.5 and 1% of the outer layer 11 by weight.

The present dog chew has been found to provide excellent nutritional value, while still being durable and also easily colorable.

While the chew is preferably gluten and grain free, rice could be added in the outer layer to reduce cost, for example in amount of about 10% by weight, replacing the potato or sweet potato amounts.

While the preferred shape is a laminated dog chew with knotted ends, other layered shapes are possible in less preferred embodiments.

The present dog chew may be manufactured with methods similar to those disclosed in co-assigned U.S. Pat. No. 8,449,937, said patent being incorporated hereby by reference herein.

What is claimed is:

1. A pet chew comprising:
   an outer layer; and
   an inner layer, the outer and inner layers being laminated and rolled into a cylindrical shape having knots at both ends, the outer layer including sweet potato.

2. The pet chew as recited in claim 1 wherein the inner layer is made of an animal-product jerky.

3. The pet chew as recited in claim 2 wherein the jerky is chicken breast jerky.

4. The pet chew as recited in claim 1 wherein the inner layer constitutes 5 to 10% of the total weight of the pet-chew.

5. The pet chew as recited in claim 1 wherein the outer layer includes bone powder or meal.

6. The pet chew as recited in claim 5 wherein the percentage of bone powder by weight of the outer layer is 8 to 12 percent.

7. The pet chew as recited in claim 1 wherein the outer layer is free of rawhide.

8. The pet chew as recited in claim 1 wherein the amount of sweet potato constitutes at least 20 percent of the outer layer by weight.

9. The pet chew as recited in claim 8 wherein the amount of sweet potato constitutes between 20 and 30 percent of the outer layer by weight.

10. The pet chew as recited in claim 1 wherein a total weight of the outer layer from animal sources is 50 percent or more.

11. The pet chew as recited in claim 10 wherein meat constitutes between 35 and 45 percent of the outer layer by weight.

12. The pet chew as recited in claim 1 wherein the outer layer includes fresh chicken meat.

13. The pet chew as recited in claim 1 wherein edible glycerin constitutes between 2 and 4% of the outer layer by weight.

14. The pet chew as recited in claim 1 wherein the outer layer further includes carrot.

15. The pet chew as recited in claim 1 wherein the outer layer is gluten free.

* * * * *